(12) United States Patent
Levesque et al.

(10) Patent No.: US 12,732,100 B2
(45) Date of Patent: Sep. 8, 2026

(54) FRACTIONAL CHARGE PUMP CONVERTERS

(71) Applicant: Qorvo US, Inc., Greensboro, NC (US)

(72) Inventors: Chris Levesque, Fountain Valley, CA (US); Mudar Al-Joumayly, Casselberry, FL (US)

(73) Assignee: Qorvo US, Inc., Greensboro, NC (US)

( * ) Notice: Subject to any disclaimer, the term of this patent is extended or adjusted under 35 U.S.C. 154(b) by 47 days.

(21) Appl. No.: 18/418,826

(22) Filed: Jan. 22, 2024

(65) Prior Publication Data

US 2024/0250610 A1 Jul. 25, 2024

Related U.S. Application Data

(60) Provisional application No. 63/441,088, filed on Jan. 25, 2023.

(51) Int. Cl.
*H02M 3/07* (2006.01)

(52) U.S. Cl.
CPC .................................. *H02M 3/073* (2013.01)

(58) Field of Classification Search
CPC ................................ H02M 3/073; H02M 3/07
See application file for complete search history.

(56) References Cited

U.S. PATENT DOCUMENTS

| | | | | |
|---|---|---|---|---|
| 2008/0158915 | A1* | 7/2008 | Williams ................ | H02M 3/07 363/21.06 |
| 2011/0234305 | A1 | 9/2011 | Lesso | |
| 2019/0393776 | A1* | 12/2019 | Low ........................ | H02M 3/07 |
| 2020/0112300 | A1* | 4/2020 | Balteanu .......... | H03K 3/356104 |

FOREIGN PATENT DOCUMENTS

| | | | |
|---|---|---|---|
| CN | 103501110 | * | 1/2014 |
| CN | 103501110 | A | 1/2014 |
| CN | 103607115 | A | 2/2014 |
| CN | 203491890 | U | 3/2014 |
| CN | 203537232 | U | 4/2014 |

OTHER PUBLICATIONS

Maxim, "1.5x/2x High-Efficiency White LEDCharge Pumps," MAX1910/MAX1912 Data Sheet, 19-2290, Rev. 2, Mar. 2004, Maxim Integrated Products, 11 pages.

* cited by examiner

*Primary Examiner* — Sibin Chen

(74) *Attorney, Agent, or Firm* — Withrow & Terranova, P.L.L.C.

(57) ABSTRACT

Embodiments of a charge pump converter are disclosed. In some embodiments, the charge pump converter includes a first switch, a second switch, a third switch, a first charge storage device, and a second charge storage device. The first charge storage device is connected between the first switch and the second switch. The second charge storage device is connected between the second switch and the third switch. In a charging state, the charge pump converter charges the first charge storage device and the second charge storage device. In a multiplying state, the charge pump converter discharges the first charge storage device and the second charge storage device. The multiplying state allows for the charge pump converter to generate voltage higher than an input voltage.

15 Claims, 11 Drawing Sheets

FRACTIONAL CHARGE PUMP CONVERTERS

RELATED APPLICATIONS

This application claims the benefit of provisional patent application Ser. No. 63/441,088, filed Jan. 25, 2023, the disclosure of which is hereby incorporated herein by reference in its entirety.

FIELD OF THE DISCLOSURE

The present disclosure relates generally to charge pump converters. Still more particularly, the present disclosure relates to charge pump converters that are operable to output fractional converted voltages.

SUMMARY

Embodiments disclosed herein provide fractional charge pump converters that are operable to multiple an input voltage by a fraction multiplier to produce an output voltage. In a first non-limiting non-exclusive example, a fractional charge pump converter is operable to multiple a twelve (12) volt (V) input voltage by a fraction multiplier of 1.5 to produce an eighteen (18) V output voltage. In a second non-limiting non-exclusive example, a fractional charge pump converter is operable to multiple a twelve (12) V input voltage by a fraction multiplier of 1.33 to produce a sixteen (16) V output voltage. One or more advantages to a fractional charge pump converter may be a small size, low cost, a very high efficiency, and/or a very low output voltage ripple.

In some embodiments, a charge pump converter, includes: a first switch; a second switch; a first charge storage device connected between the first switch and the second switch; a third switch; and a second charge storage device connected between the second switch and the third switch, wherein the charge pump converter is operable to operate: in a charging state that charges the first charge storage device and the second charge storage device; and in a multiplying state that discharges the first charge storage device and the second charge storage device. In some embodiments, the first charge storage device and the second charge storage device are capacitors. In some embodiments, the first switch is a first single pole double throw switch; the second switch is a double pole double throw switch; and the third switch is a second single pole double throw switch. In some embodiments, the first switch, the second switch, and the third switch are each one or more transistors. In some embodiments, the one or more transistors are metal-oxide-semiconductor field effect transistors. In some embodiments, a charge pump converter, includes: a first switch; a second switch; a first charge storage device connected between the first switch and the second switch; a third switch; a second charge storage device connected between the second switch and the third switch; a fourth switch; and a third charge storage device connected between the third switch and the fourth switch, wherein the charge pump converter is operable to operate in: a charging state that charges the first charge storage device, the second charge storage device, and the third charge storage device; and a multiplying state that discharges the first charge storage device, the second charge storage device, and the third charge storage device. In some embodiments, the first charge storage device, the second charge storage device, and the third charge storage device are capacitors. In some embodiments, the first switch is a first single pole double throw switch; the second switch is a first double pole double throw switch; the third switch is a second double pole double throw switch; and the fourth switch is a second single pole double throw switch. In some embodiments, the first switch, the second switch, the third switch, and the fourth switch are each one or more transistors. In some embodiments, the one or more transistors are metal-oxide-semiconductor field effect transistors.

In some embodiments, a method of operating a fractional charge pump converter includes: controlling or setting switches into a state that configures a fractional charge pump converter to a charging state, wherein, in the charging state, charge storage devices are charged; controlling or setting the switches to a different state that configures the fractional charge pump converter from the charging state to a multiplying state, wherein, in the multiplying state, the charge storage devices are discharged. In some embodiments, in the multiplying state a voltage level stored in one or more of the charge storage devices is discharged to add to an input voltage to generate an output voltage. In some embodiments, the output voltage is equal to the voltage level stored the one or more of the charge storage devices plus the input voltage. In some embodiments, for at least a first one of the storage devices, the multiplying state enables a voltage level stored on the first one of the storage devices to discharge and add to an input voltage to generate an output voltage. In some embodiments, for at least a first one of the storage device, the multiplying state enables six (6) V stored on the first one of the storage devices to discharge and add to a twelve (12) V input voltage to generate an eighteen (18) V output voltage.

In some embodiments, a user element including a charge pump converter, the charge pump converter includes: a first switch; a second switch; a first charge storage device connected between the first switch and the second switch; a third switch; and a second charge storage device connected between the second switch and the third switch, wherein the charge pump converter is operable to operate: in a charging state that charges the first charge storage device and the second charge storage device; and in a multiplying state that discharges the first charge storage device and the second charge storage device. In some embodiments, the first charge storage device and the second charge storage device are capacitors. In some embodiments, the first switch is a first single pole double throw switch; the second switch is a double pole double throw switch; and the third switch is a second single pole double throw switch. In some embodiments, the first switch, the second switch, and the third switch are each one or more transistors. In some embodiments, the one or more transistors are metal-oxide-semiconductor field effect transistors.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
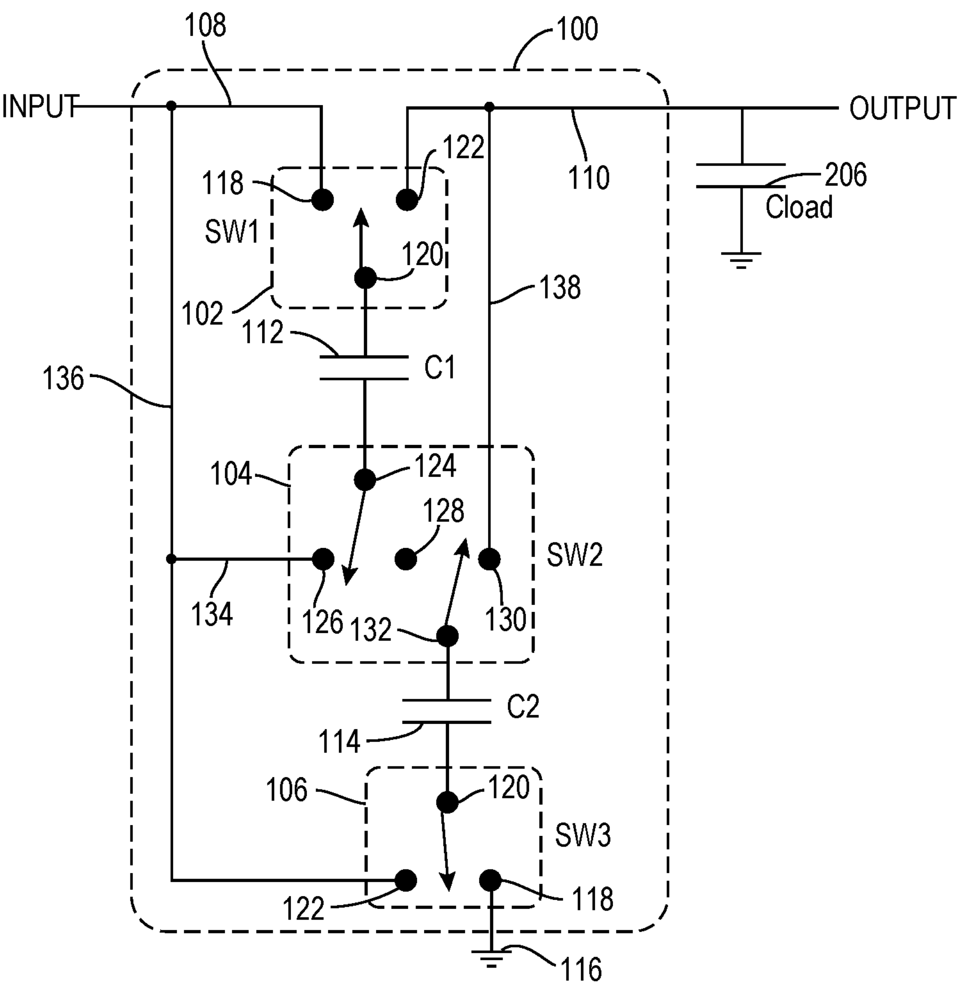
FIG. 1 illustrates a schematic of a first charge pump converter in accordance with embodiments of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 illustrates a schematic of a first charge pump converter 100 in accordance with embodiments of the disclosure. The first charge pump converter 100 includes a first switch (SW1) 102, a second switch (SW2) 104, and a third switch (SW3) 106. The first switch 102 is connected between an input signal line 108 and an output signal line 110. A first charge storage device 112 is connected between the first switch 102 and the second switch 104. A second charge storage device 114 is connected between the second switch 104 and the third switch 106. The third switch 106 is also connected to a reference voltage 116, such as ground. In the illustrated embodiment, the first charge storage device 112 is a first capacitor (C1) and the second charge storage device 114 is a second capacitor (C2).

In certain embodiments, the first charge storage device 112, the second charge storage device 114, the first switch

102, the second switch 104, and the third switch 106 are implemented as part of an integrated circuit (IC). In other embodiments, one or more of the first charge storage device 112 and/or the second charge storage device 114 are implemented external to, and connected to, an IC. A determination of whether the first charge storage device 112 and/or the second charge storage device 114 are implemented within an IC or not may be based at least in part on the values of the first charge storage device 112 and the second charge storage device 114 (e.g., the capacitance values). In some embodiments, values of the first charge storage device 112 and the second charge storage device 114 depend on the end application. In a non-limiting nonexclusive example, charge storage devices with very small capacitance values can be integrated into the IC, but charge storage devices with larger capacitance values are not integrated into the IC.

In the illustrated embodiment, the first switch 102 and the third switch 106 are each single pole double throw switches. The first switch 102 and the third switch 106 each include a first terminal 118, a second terminal 120, and a third terminal 122. The first terminal 118 of the first switch 102 is connected to the input signal line 108. The second terminal 120 of the first switch 102 is connected to the first charge storage device 112. The third terminal 122 of the first switch 102 is connected to the output signal line 110. The first switch 102 is configured to be set to a first state or to a second state. In the first state, the second terminal 120 is connected to the first terminal 118. The first state of the first switch 102 connects the input signal line 108 to the first charge storage device 112. In the second state, the second terminal 120 is connected to the third terminal 122. The second state of the first switch 102 connects the first charge storage device 112 to the output signal line 110.

The second terminal 120 of the third switch 106 is connected to the second charge storage device 114. The third terminal 122 of the third switch 106 is connected to the signal line 136. The first terminal 118 of the third switch 106 is connected to the reference voltage 116. The third switch 106 is configured to be set to a first state or to a second state. In the first state, the second terminal 120 is connected to the first terminal 118. The first state of the third switch 106 connects the second charge storage device 114 to the reference voltage 116. In the second state, the second terminal 120 is connected to the third terminal 122. The second state of the third switch 106 connects the second charge storage device 114 to the input signal line 108.

In the illustrated embodiment, the second switch 104 is a double pole double throw switch. The second switch 104 includes a first terminal 124, a second terminal 126, a third terminal 128, a fourth terminal 130, and a fifth terminal 132. The second switch 104 is operable to switch to one of a third state or a fourth state. In the third state, the first terminal 124 is connected to the third terminal 128, and the third terminal 128 is connected to the fifth terminal 132. The third state connects the first charge storage device 112 to the second charge storage device 114. In the fourth state, the first terminal 124 is connected to the second terminal 126 and the fifth terminal 132 is connected to the fourth terminal 130. The fourth state connects the first charge storage device 112 to the input signal line 108 and the second charge storage device 114 to the output signal line 110. In the fourth state, the input voltage on the signal line 136 is divided equally on the first charge storage device 112 and the second charge storage device 114 such that each charge storage device stores a voltage equal to half the input voltage (e.g., input voltage divided by two).

The first charge pump converter 100 is a fractional voltage multiplier charge pump (or a ratio voltage multiplier pump). The first charge pump converter 100 is operable to operate in one of a first state or a second state. The first state produces a first signal path to charge the first charge storage device 112 and the second charge storage device 114. The first state is referred to herein as a charging state. The charging state is described in more detail in conjunction with FIG. 2A.

The second state of the first charge pump converter 100 creates two separate signal paths, a second signal path and a third signal path. The second signal path and the third signal path place the first charge storage device 112 and the second charge storage device 114 in parallel with each other and connect the first charge storage device 112 and the second charge storage device 114 in series with the input signal line 108 and the output signal line 110. The first charge pump converter 100 receives the input voltage on the input signal line 108 and generates the output voltage on the output signal line 110. The second state is referred to herein as a multiplying state. The multiplying state is described in more detail in conjunction with FIG. 2B.

Figure 2A:
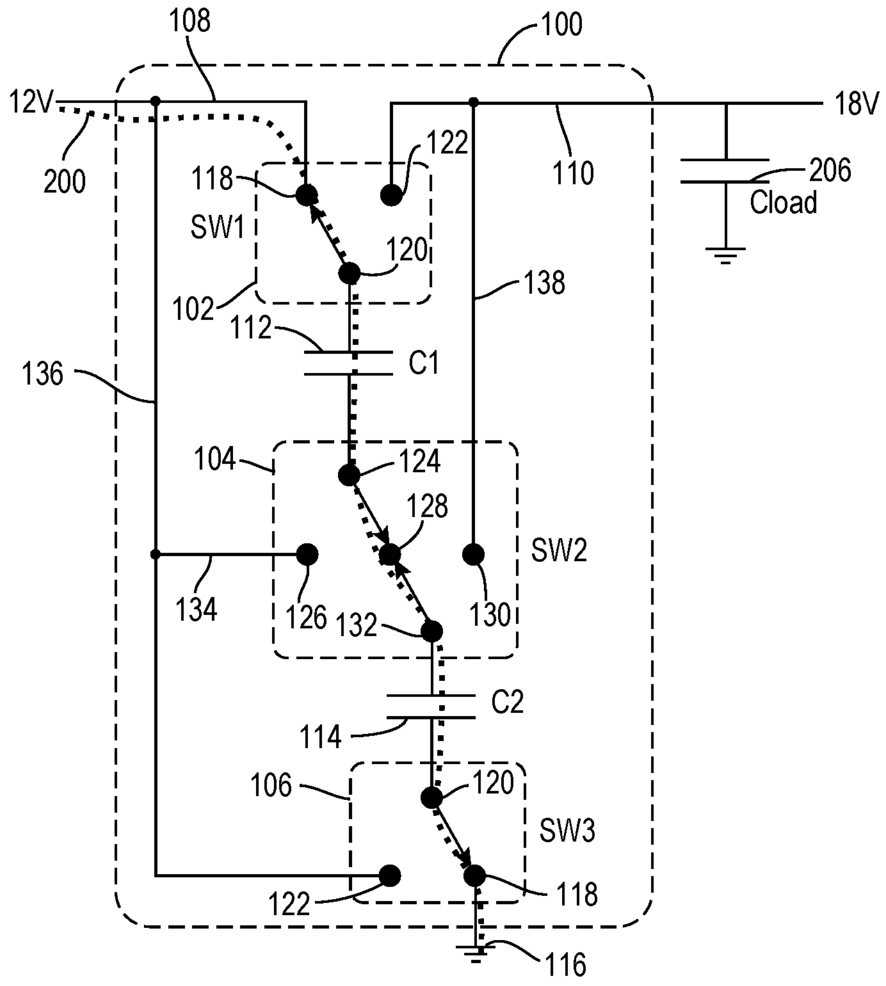
FIG. 2A illustrates the charging state of the first charge pump converter shown in FIG. 1 in accordance with embodiments of the disclosure.
Figure 2B:
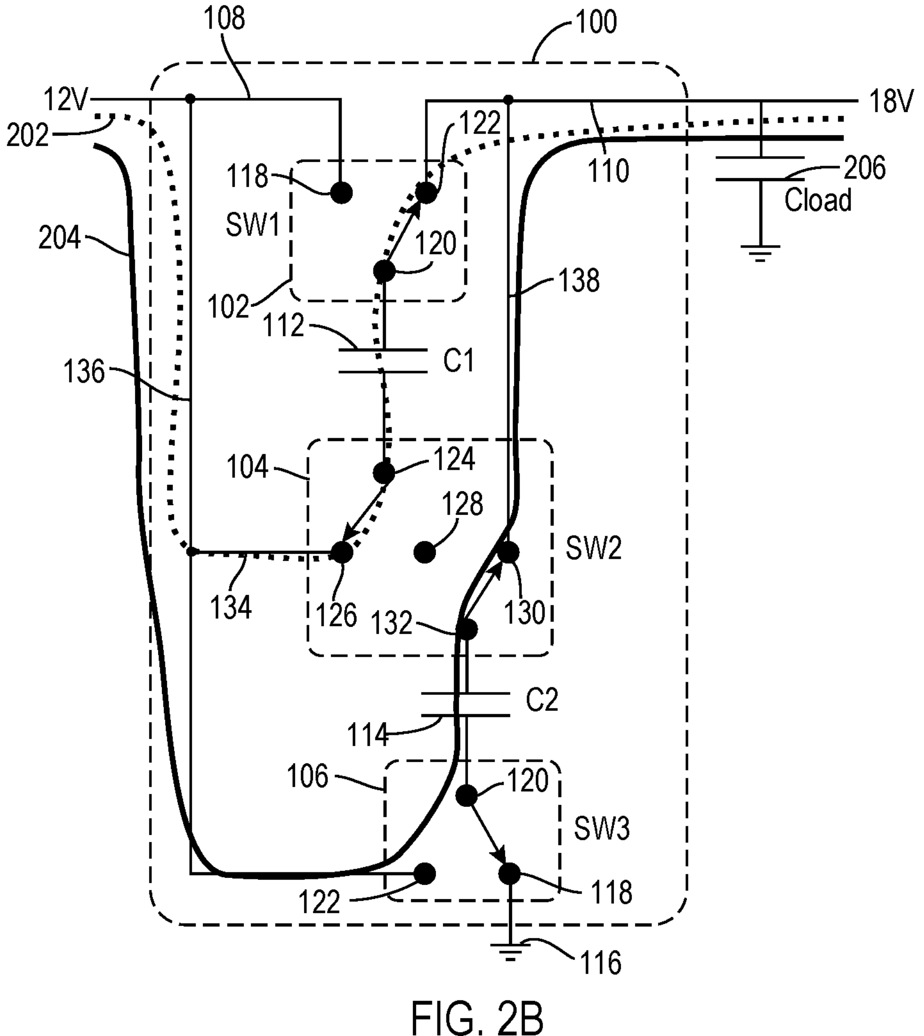
FIG. 2B illustrates the multiplying state of the first charge pump converter shown in FIG. 1 in accordance with embodiments of the disclosure.

In a non-limiting nonexclusive first example shown in FIGS. 2A-2B, the first charge pump converter 100 is described as receiving a twelve (12) V input on the input signal line 108 and outputting an eighteen (18) V output on the output signal line 110. Thus, the first charge pump converter 100 has a fraction multiplier of one and a half (1.5) or a ratio of 3:2. Other embodiments are not limited to this implementation. The input voltage, the output voltage, and the fraction multiplier can differ in other embodiments.

FIG. 2A illustrates a charging state of the first charge pump converter 100 shown in FIG. 1 in accordance with embodiments of the disclosure. The charging state of the first charge pump converter 100 creates a first signal path 200 to charge the first charge storage device 112 and the second charge storage device 114. In the charging state, the first switch 102 is set to the first state, the second switch 104 to the third state, and the third switch 106 to the first state. As described earlier, in the first state, the first switch 102 connects the first terminal 118 to the second terminal 120. Since the first terminal 118 is connected to the input signal line 108 and the second terminal is connected to the first charge storage device 112, the first charge storage device 112 is connected to the input signal line 108.

The third state of the second switch 104 connects the first terminal 124 to the third terminal 128 and connects the third terminal 128 to the fifth terminal 132. The third state of the second switch 104 connects the first charge storage device 112 to the second charge storage device 114 such that the first charge storage device 112 and the second charge storage device 114 are connected in series.

The first state of the third switch 106 connects the second terminal 120 to the first terminal 118. Since the first terminal 118 is connected to the reference voltage 116 and the second terminal 120 is connected to the second charge storage device 114, the second charge storage device 114 is connected to the reference voltage 116.

The first state of the first switch 102, the third state of the second switch 104, and the first state of the third switch 106 create the first signal path 200. The first signal path 200 connects the first charge storage device 112 and the second charge storage device 114 in series and connects the first charge storage device 112 to the input signal line 108 and the second charge storage device 114 to the reference voltage (e.g., ground). In the illustrated embodiment, the charging state enables the first charge storage device 112 and the second charge storage device 114 to be charged using the input voltage of twelve (12) V on the input signal line 108. The first charge storage device 112 charges to six (6) V and the second charge storage device 114 to six (6) V.

FIG. 2B illustrates a multiplying state of the first charge pump converter 100 shown in FIG. 1 in accordance with embodiments of the disclosure. The multiplying state of the first charge pump converter 100 creates a second signal path 202 and a third signal path 204 simultaneously to output eighteen (18) V on the output signal line 110. In the multiplying state, the first switch 102 is set to the second state, the second switch 104 to the fourth state, and the third switch 106 to the second state. As described earlier, in the second state, the first switch 102 connects the second terminal 120 to the third terminal 122. Since the second terminal 120 is connected to the first charge storage device 112 and the third terminal 122 to the output signal line 110, the first charge storage device 112 is connected to the output signal line 110.

The fourth state of the second switch 104 connects the first terminal 124 to the second terminal 126 and connects the fifth terminal 132 to the fourth terminal 130. The fourth state of the second switch 104 connects the first charge storage device 112 to the input signal line 108 and connects the second charge storage device 114 to the output signal line 110.

The second state of the third switch 106 connects the second terminal 120 to the third terminal 122. Since the second terminal 120 is connected to the second charge storage device 114 and the third terminal 122 is connected to the input signal line 108, the second charge storage device 114 is connected to the input signal line 108.

The second state of the first switch 102 and the fourth state of the second switch 104 create the second signal path 202. The fourth state of the second switch 104 and the second state of the third switch 106 create the third signal path 204. The second signal path 202 and the third signal path 204 cause the first charge storage device 112 and the second charge storage device 114 to be connected in parallel with each other, and cause the first charge storage device 112 and the second charge storage device 114 to be connected in series with the input signal line 108 and the output signal line 110. The first charge pump converter 100 receives the twelve (12) V input voltage on the input signal line 108 and outputs the eighteen (18) V output voltage on the output signal line 110. The multiplying state enables the six (6) V stored on the first charge storage device 112 to discharge and add to the twelve (12) V input voltage to generate the eighteen (18) V output voltage. The multiplying state also enables the six (6) V stored on the second charge storage device 114 to discharge and add to the twelve (12) V input voltage to generate the eighteen (18) V output voltage. In the illustrated embodiment, the eighteen (18) V is used to charge a load charge storage device 206. The load charge storage device 206 is represented by a load capacitor (Cload).

Figure 3:
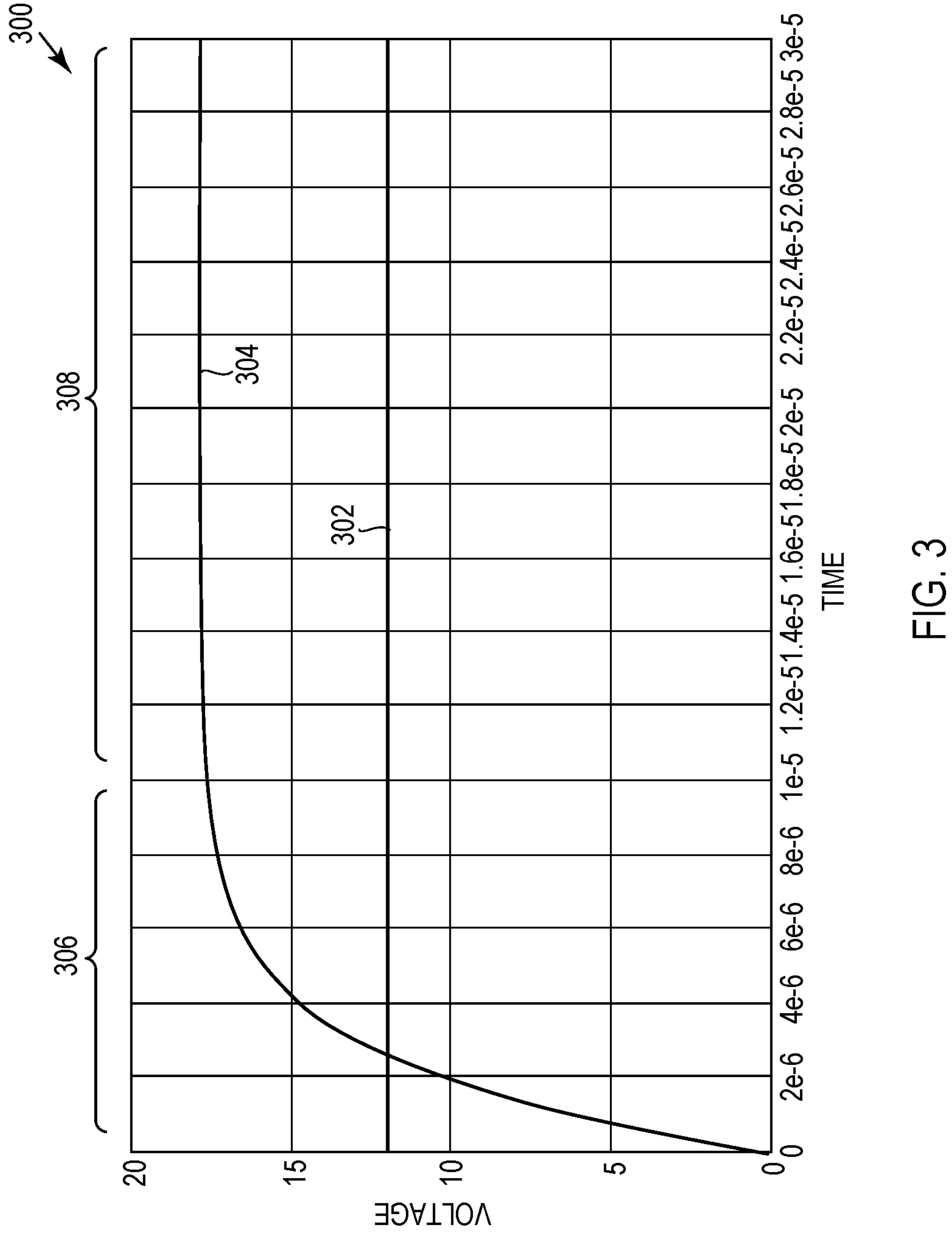
FIG. 3 illustrates a graph of a plot of an input voltage and a plot of an output voltage of the first charge pump converter shown in FIG. 1 in accordance with embodiments of the disclosure.

FIG. 3 illustrates an example graph 300 of a plot 302 of an input voltage and a plot 304 of an output voltage of the first charge pump converter 100 shown in FIG. 1 in accordance with embodiments of the disclosure. The vertical axis represents voltage, and the horizontal axis represents time. FIG. 3 is described with the input voltage of twelve (12) V and the output voltage of eighteen (18) V. As described earlier, other embodiments are not limited to this implementation.

The plot 302 depicts the twelve (12) V input voltage across time. The plot 304 represents the output voltage across time. During a first time period 306, the output voltage increases from zero (0) volts to eighteen (18) V. The output voltage remains at eighteen (18) V during a subsequent second time period 308.

Figure 4:
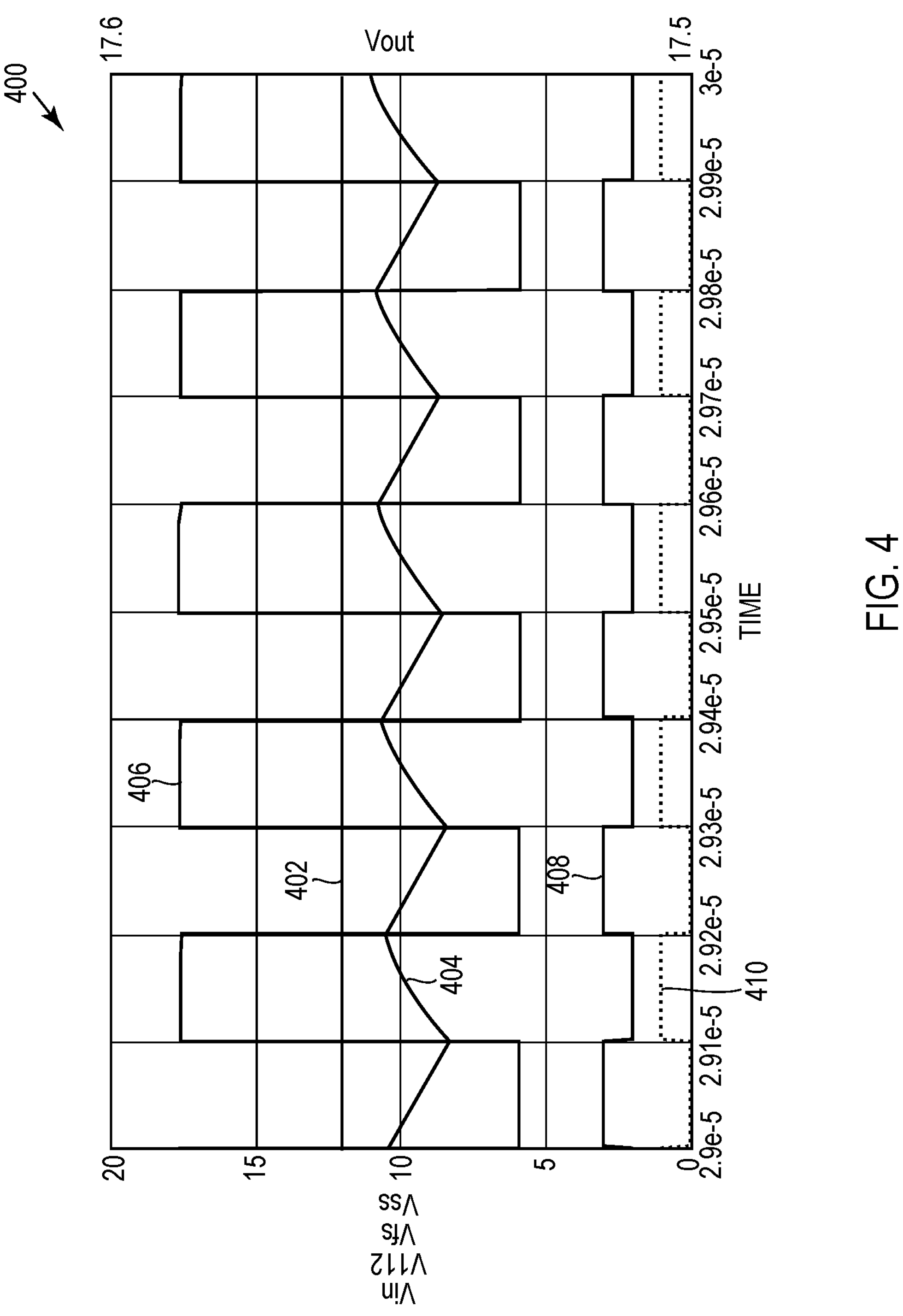
FIG. 4 illustrates an example timing diagram of the first charge pump converter shown in FIG. 1 in accordance with embodiments of the disclosure.

FIG. 4 illustrates an example timing diagram 400 of the first charge pump converter 100 shown in FIG. 1 in accordance with embodiments of the disclosure. The left vertical axis represents voltage for plots 402, 406, 408, 410, the right vertical axis represents voltage for plot 404, and the horizontal axis time. Plot 402 depicts the input voltage (Vin) on the input signal line 108 (FIG. 4), plot 404 depicts the output voltage (Vout) on the output signal line 110, plot 406 depicts a voltage at the first charge storage device 112 (V112), plot 408 depicts a first switch control signal (Vfs), and plot 410 depicts a second switch control signal (Vss). The first switch control signal and the second switch control signal are used to control the first switch 102, the second switch 104, and the third switch 106. In the illustrated embodiment, the first switch control signal and the second switch control signal are non-overlapping signals.

When the first switch control signal transitions from a low level to a high level (plot 608) and the second switch control signal transitions from a high level to a low level (plot 610), the first charge pump converter 100 switches to the multiplying state. In the multiplying state, the charge stored on he the first charge storage device 112 discharges, which causes the voltage at the first charge storage device 112 to decrease (as shown in plot 406). When the first switch control signal transitions from the high level to the low level (plot 608) and the second switch control signal transitions from the low level to the high level (plot 610), the first charge pump converter 100 switches to the charging state. In the charging state, the first charge storage device 112 charges, which causes the voltage at the first charge storage device 112 to increase (as shown in plot 406).

For the example timing diagram 400, a capacitance of the first charge storage device 112 (FIG. 1) and a capacitance of the second charge storage device 114 are each forty-seven (47) nanofarads (nF) and a capacitance of the load charge storage device 206 is four hundred and seventy (470) nF. In a non-limiting nonexclusive example, a case size for such capacitance values can be as small as six-tenths (0.6) millimeters (mm) by three-tenths (0.3) mm. In certain embodiments, a voltage rating of the first charge storage device 112 and the second charge storage device 114 is greater than Vinput/2. The capacitances of the first charge storage device 112, the second charge storage device 114, and/or the load charge storage device 206 may differ in other embodiments. Additionally, the plots in a timing diagram for the first charge pump converter 100 can be different in other embodiments.

Figure 5:
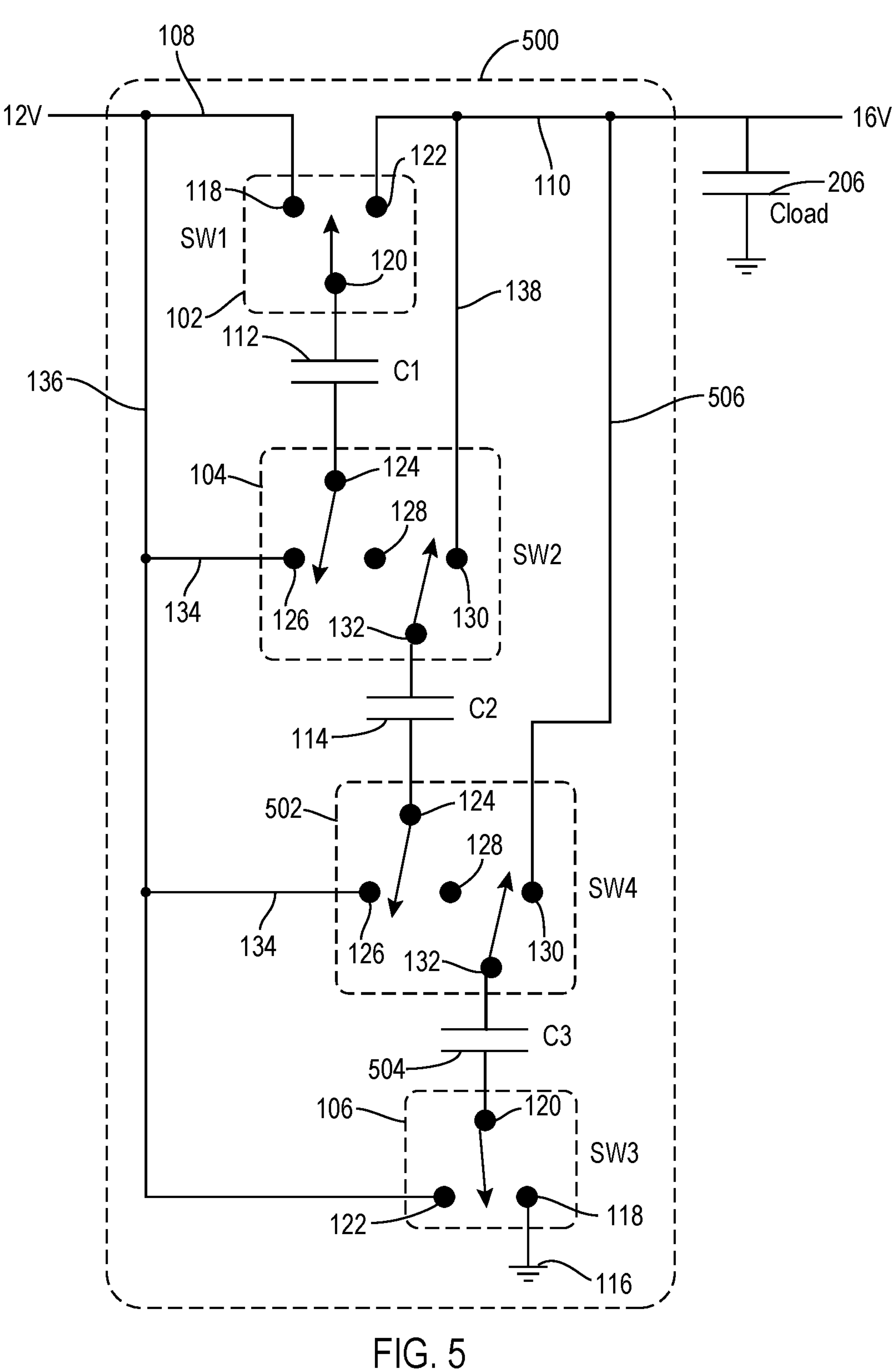
FIG. 5 illustrates a schematic of a second charge pump converter in accordance with embodiments of the disclosure.

FIG. 5 illustrates a schematic of a second charge pump converter 500 in accordance with embodiments of the disclosure. The illustrated second charge pump converter 500 has a fraction multiplier of one and one third (1.33) or a ratio of 4:3. Other embodiments are not limited to this implementation. The input voltage, the output voltage, and the fraction multiplier can differ in other embodiments.

The second charge pump converter 500 is similar to the first charge pump converter 100 shown in FIG. 1 but with the addition of a fourth switch (SW4) 502 and a third charge storage device 504. Like the first charge storage device 112 and the second charge storage device 114, the third charge storage device 504 is depicted as a capacitor (C3).

The first switch 102 is connected between the input signal line 108 and the output signal line 110. The first charge storage device 112 is connected between the first switch 102 and the second switch 104. The second charge storage device 114 is connected between the second switch 104 and the fourth switch 502. The third charge storage device 504 is connected between the fourth switch 502 and the third switch 106. The third switch 106 is connected to the reference voltage 116.

The example first switch 102, the example second switch 104, and the example third switch 106 are each constructed as shown and described in conjunction with FIG. 1. Accordingly, the first switch 102, the second switch 104, and the third switch 106 are not described in detail again. The fourth switch 502 is constructed similarly to the second switch 104. The fourth switch 502 includes the first terminal 124, the second terminal 126, the third terminal 128, the fourth terminal 130, and the fifth terminal 132. The fourth switch 502 is operable to switch to one of the third state or the fourth state. In the third state, the first terminal 124 is connected to the third terminal 128, and the third terminal 128 is connected to the fifth terminal 132. The third state connects the second charge storage device 114 to the third charge storage device 504. In the fourth state, the first terminal 124 is connected to the second terminal 126 and the fifth terminal 132 is connected to the fourth terminal 130. The fourth state connects the second charge storage device 114 to the input signal line 108 (via signal line 136) and the third charge storage device 504 to the output signal line 110 via signal line 506.

The second charge pump converter 500 is a fractional voltage multiplier charge pump (or a ratio voltage multiplier pump). The second charge pump converter 500 is operable to operate in one of the first state (e.g., the charging state) or the second state (e.g., the multiplying state). The charging state produces a fourth signal path to charge the first charge storage device 112, the second charge storage device 114, and the third charge storage device 504. The charging state is described in more detail in conjunction with FIG. 6A.

The second state of the second charge pump converter 500 creates three separate signal paths, the second signal path, a fifth signal path, and a sixth signal path. The second signal path, the fifth signal path, and the sixth signal path place the first charge storage device 112, the second charge storage device 114, and the third charge storage device 504 in parallel with each other, and connect the first charge storage device 112, the second charge storage device 114, and the third charge storage device 504 in series with the input signal line 108 and the output signal line 110. The second charge pump converter 500 receives the input voltage on the input signal line 108 and generates the output voltage on the output signal line 110. The multiplying state is described in more detail in conjunction with FIG. 6B.

Figure 6A:
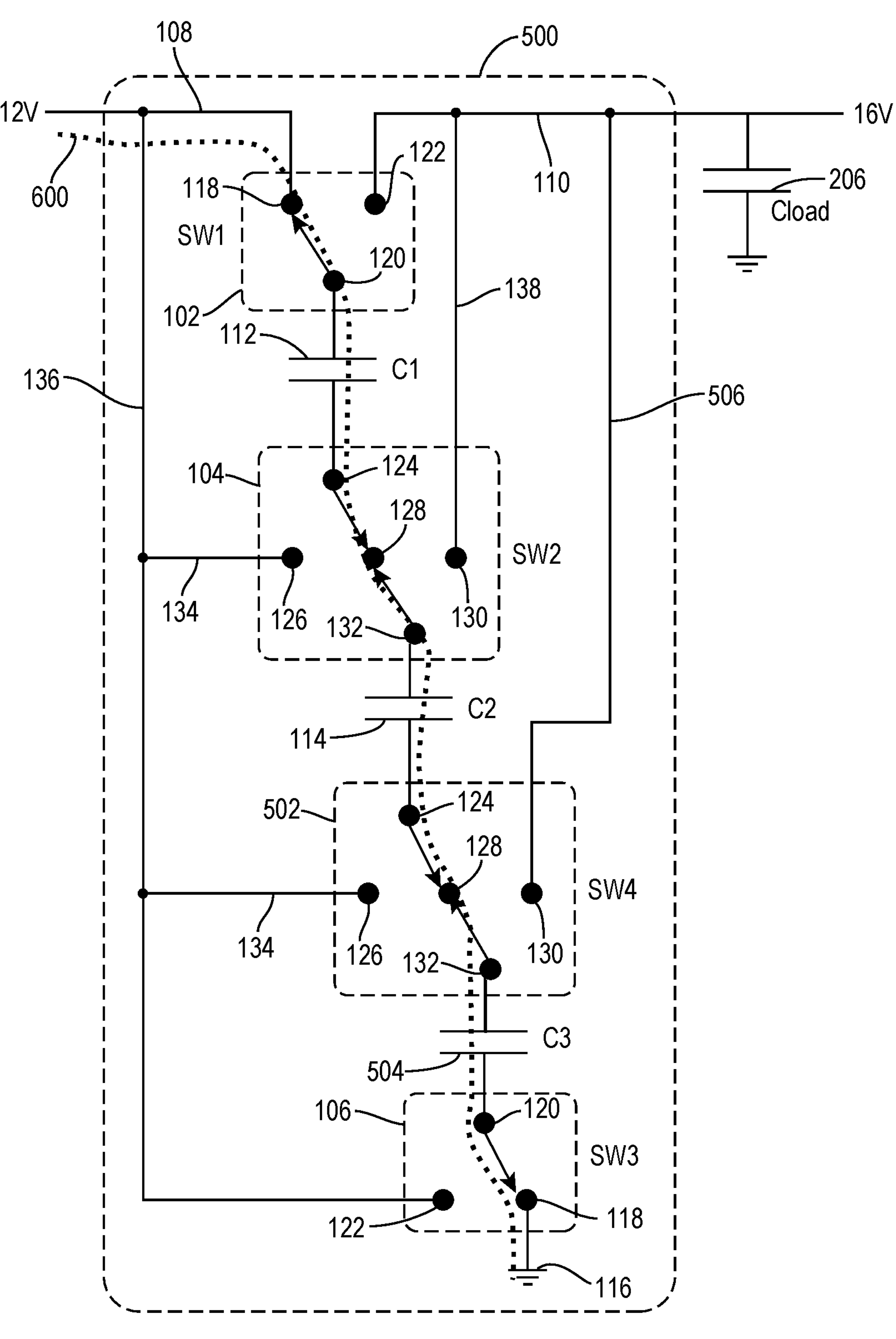
FIG. 6A illustrates the charging state of the second charge pump converter shown in FIG. 5 in accordance with embodiments of the disclosure.
Figure 6B:
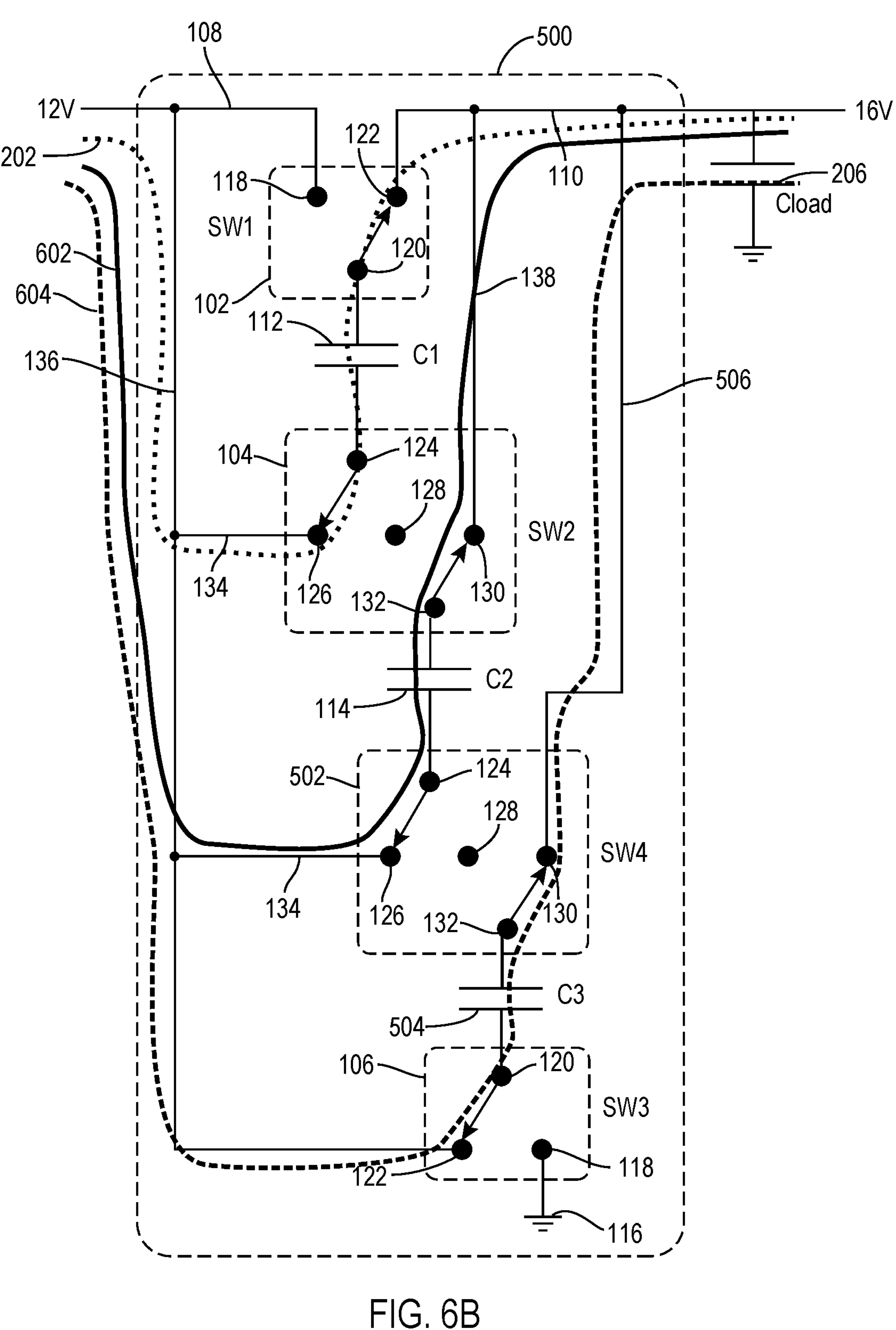
FIG. 6B illustrates the multiplying state of the second charge pump converter shown in FIG. 5 in accordance with embodiments of the disclosure.

In a non-limiting nonexclusive first example shown in FIGS. 6A-6B, the second charge pump converter 500 is described as receiving a twelve (12) V input on the input signal line 108 and outputting a sixteen (16) V output on the output signal line 110. Thus, the second charge pump converter 500 has a fraction multiplier of one and a third (1.33) or a ratio of 4:3. Other embodiments are not limited to this implementation. The input voltage, the output voltage, and the fraction multiplier can differ in other embodiments.

FIG. 6A illustrates the charging state of the second charge pump converter 500 shown in FIG. 5 in accordance with embodiments of the disclosure. The charging state of the second charge pump converter 500 creates a fourth signal path 600 to charge the first charge storage device 112, the second charge storage device 114, and the third charge storage device 504. In the charging state, the first switch 102 is set to the first state, the second switch 104 to the third state, the third switch 106 to the first state, and the fourth switch 502 to the third state. As described earlier, in the first state, the first switch 102 connects the first terminal 118 to the second terminal 120. Since the first terminal 118 is connected to the input signal line 108 and the second terminal is connected to the first charge storage device 112, the first charge storage device 112 is connected to the input signal line 108.

The third state of the second switch 104 connects the first terminal 124 to the third terminal 128 and connects the third terminal 128 to the fifth terminal 132. The third state of the second switch 104 connects the first charge storage device 112 to the second charge storage device 114 such that the first charge storage device 112 and the second charge storage device 114 are connected in series.

The third state of the fourth switch 502 connects the first terminal 124 to the third terminal 128 and connects the third terminal 128 to the fifth terminal 132. The third state of the fourth switch 502 connects the second charge storage device 114 to the third charge storage device 504 such that the second charge storage device 114 and the third charge storage device 504 are connected in series.

The first state of the third switch 106 connects the second terminal 120 to the first terminal 118. Since the first terminal 118 is connected to the reference voltage 116 and the second terminal 120 is connected to the third charge storage device 504, the third charge storage device 504 is connected to the reference voltage 116.

The first state of the first switch 102, the third state of the second switch 104, the third state of the fourth switch 502, and the first state of the third switch 106 create the fourth signal path 600. The fourth signal path 600 connects the first charge storage device 112, the second charge storage device 114, and the third charge storage device 504 in series, and connects the first charge storage device 112 to the input signal line 108 and the third charge storage device 504 to the reference voltage (e.g., ground). In the illustrated embodiment, the charging state enables the first charge storage device 112, the second charge storage device 114, and the third charge storage device 504 to be charged using the input voltage of twelve (12) V on the input signal line 108. The first charge storage device 112 charges to four (4) V, the second charge storage device 114 to four (4) V, and the third charge storage device 504 to four (4) V.

FIG. 6B illustrates the multiplying state of the second charge pump converter 500 shown in FIG. 5 in accordance with embodiments of the disclosure. The multiplying state of the second charge pump converter 500 creates the second signal path 202, the fifth signal path 602, and the sixth signal path 604 simultaneously to output sixteen (16) V on the output signal line 110. In the multiplying state, the first switch 102 is set to the second state, the second switch 104 to the fourth state, the third switch 106 to the second state, and the fourth switch 502 to the fourth state. As described earlier, in the second state, the first switch 102 connects the second terminal 120 to the third terminal 122. Since the second terminal 120 is connected to the first charge storage device 112 and the third terminal 122 to the output signal line 110, the first charge storage device 112 is connected to the output signal line 110.

The fourth state of the second switch 104 connects the first terminal 124 to the second terminal 126 and connects the fifth terminal 132 to the fourth terminal 130. The fourth state of the second switch 104 connects the first charge storage device 112 to the input signal line 108 and connects the second charge storage device 114 to the output signal line 110.

The fourth state of the fourth switch 502 connects the first terminal 124 to the second terminal 126 and connects the fifth terminal 132 to the fourth terminal 130. The fourth state of the fourth switch 502 connects the second charge storage device 114 to the input signal line 108 and connects the third charge storage device 504 to the output signal line 110.

The second state of the third switch 106 connects the second terminal 120 to the third terminal 122. Since the second terminal 120 is connected to the third charge storage device 504 and the third terminal 122 is connected to the input signal line 108, the third charge storage device 504 is connected to the input signal line 108.

The second state of the first switch 102 and the fourth state of the second switch 104 create the second signal path 202. The fourth state of the second switch 104 and the fourth state of the fourth switch 502 create the fifth signal path 602. The fourth state of the fourth switch 502 and the second state of the third switch 106 create the sixth signal path 604. The second signal path 202, the fifth signal path 602, and the sixth signal path 604 cause the first charge storage device 112, the second charge storage device 114, and the third charge storage device 504 to be connected in parallel with each other, and connect the first charge storage device 112, the second charge storage device 114, and the third charge storage device 504 in series with the input signal line 108 and the output signal line 110. The second charge pump converter 500 receives the twelve (12) V input voltage on the input signal line 108 and outputs the sixteen (16) V output voltage on the output signal line 110. The multiplying state enables the four (4) V stored on the first charge storage device 112 to discharge and add to the twelve (12) V input voltage to generate the sixteen (16) V output voltage. The multiplying state also enables the four (4) V stored on the second charge storage device 114 to discharge and add to the twelve (12) V input voltage to generate the sixteen (16) V output voltage. The multiplying state further enables the four (4) V stored on the third charge storage device 504 to discharge and add to the twelve (12) V input voltage to generate the sixteen (16) V output voltage. In the illustrated embodiment, the eighteen (18) V is used to charge the load charge storage device 206.

Figure 7:
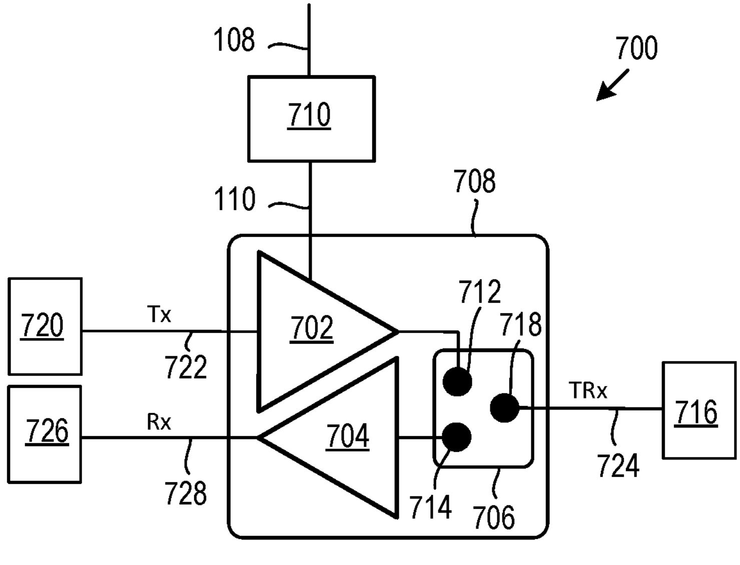
FIG. 7 illustrates a first example system that can include one or more fractional charge pump converters in accordance with embodiments of the disclosure.

FIG. 7 illustrates a first example system 700 that includes one or more fractional charge pump converters in accordance with embodiments of the disclosure. The example system 700 includes a power amplifier (PA) 702, a low noise amplifier (LNA) 704, and a switch 706. The system 700 may be implemented on an IC 708. In a non-limiting nonexclusive example, the IC 708 is, or is included in, a Wi-Fi front end module.

A fractional charge pump converter 710 is not implemented on the IC 708. Instead, the fractional charge pump converter 710 is external to the IC 708 and is connected to the PA 702. The fractional charge pump converter 710 is operable to receive the input voltage on the input signal line 108 and output the output voltage on the output signal line 110. The output voltage is supplied to the PA 702 The fractional charge pump converter 710 may include any number of switches and any number of charge storage devices. For example, the fractional charge pump converter 710 may be implemented as the first charge pump converter 100 shown in FIG. 1 or as the second charge pump converter 500 shown in FIG. 5.

The PA 702 is connected to a first terminal 712 of the switch 706. The LNA 704 is connected to a second terminal 714 of the switch 706. Radio frequency (RF) circuitry 716 is connected to a third terminal 718 of the switch 706. In a non-limiting example, the RF circuitry 716 includes an antenna.

When the system 700 is configured to transmit a signal, the system 700 is operable to receive a transmit signal (Tx) from transmitter circuitry 720 via signal line 722. The PA 702 processes the TX signal and routes the TX signal to the switch 706. The switch 706 is configured to route the TX signal to RF circuitry 716 via signal line 724. In the illustrated embodiment, the switch 706 is configured to connect the third terminal 718 to the first terminal 712.

When the system is configured to receive a signal, the system 700 is operable to receive a receive signal from the RF circuitry 716 on signal line 724. The switch 706 is configured to route the receive signal (Rx) to the LNA 704. The LNA 704 processes the Rx signal and outputs the Rx signal to receiver circuitry 726 via signal line 728. In the illustrated embodiment, the switch 706 is configured to connect the third terminal 718 to the second terminal 714.

Figure 8:
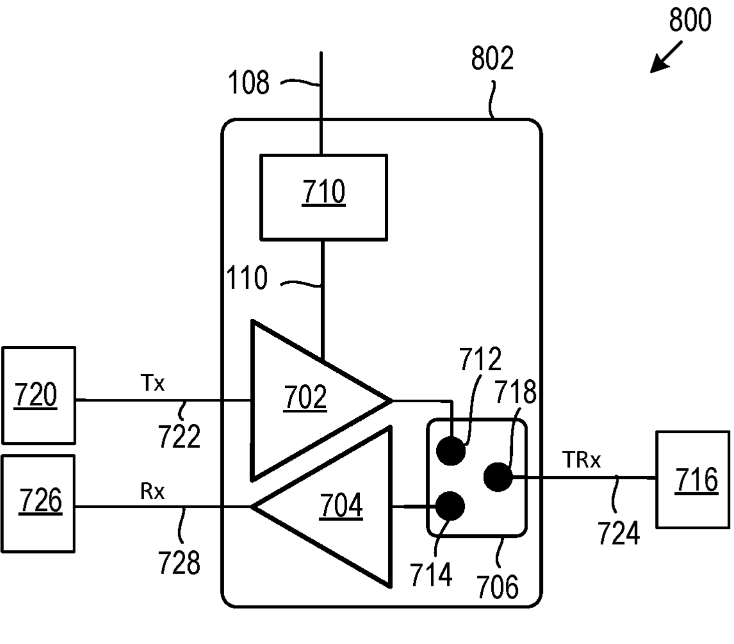
FIG. 8 illustrates a second example system that can include one or more fractional charge pump converters in accordance with embodiments of the disclosure.

FIG. 8 illustrates a second example system 800 that includes one or more fractional charge pump converters in accordance with embodiments of the disclosure. The second example system 800 is similar to the first example system 700 shown in FIG. 7 with the exception of the fractional charge pump converter 710'. In FIG. 8, the fractional charge pump converter 710' is implemented on an IC 802 along with the PA 702, the LNA 704 and the switch 706. The fractional charge pump converter 710' is connected to the PA 702. For brevity, the operation of the second example system 800 is not described in detail herein because the second example system 800 operates similar to the operation of the first example system 700 in FIG. 7.

Figure 9:
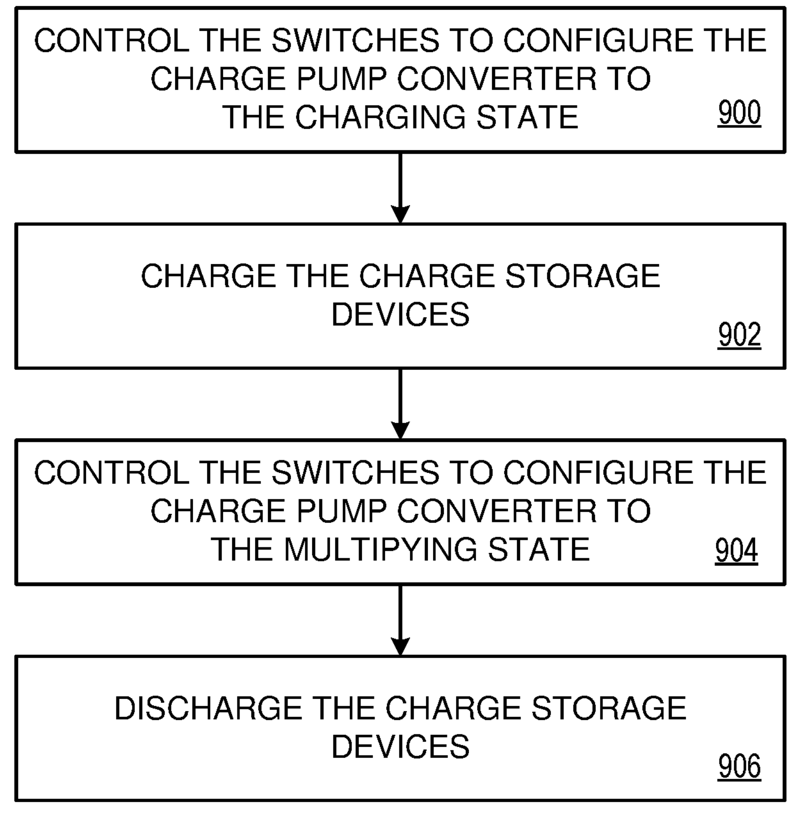
FIG. 9 illustrates an example flowchart of a method of operating a fractional charge pump converter in accordance with embodiments of the disclosure.

FIG. 9 illustrates an example flowchart of a method of operating a fractional charge pump converter in accordance with embodiments of the disclosure. The fractional charge pump converter can have any number of switches and any number of charge storage devices. Initially, as shown in block 900, the switches are set or controlled into a state that configures the fractional charge pump converter to the charging state. In the charging state, the charge storage devices are charged (block 902). Next, as shown in block 904, the switches are controlled or set to a different state that configures the fractional charge pump converter from the charging state to the multiplying state. In the multiplying state, the charge storage devices are discharged (block 906). Discharging the charge storage devices causes the output voltage to be generated. The method can repeat any number of times to continue switching the fractional charge pump converter between the charging state and the multiplying state.

Figure 10:
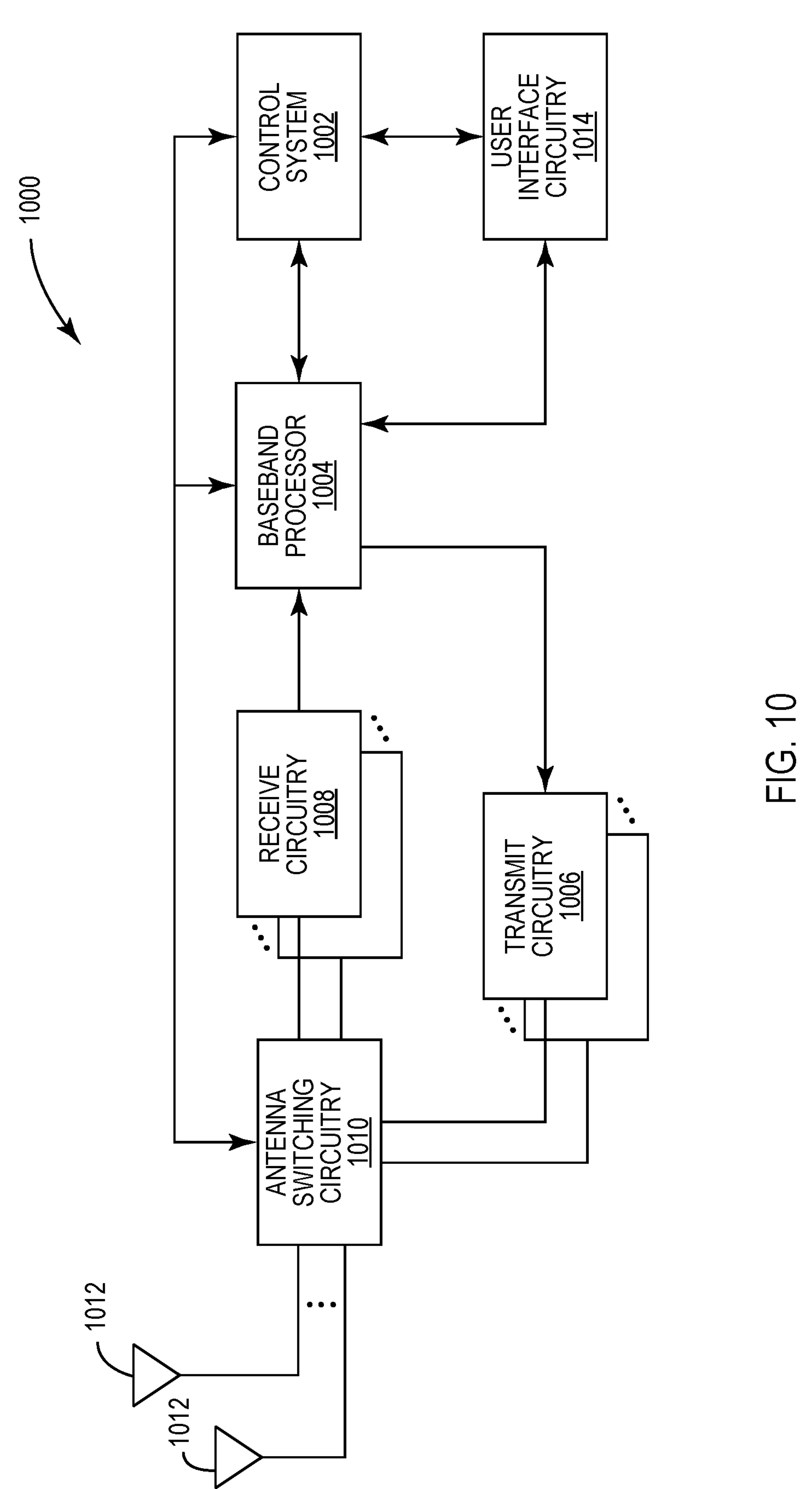
FIG. 10 illustrates example user elements that can include one or more charge pump converters in accordance with embodiments of the disclosure.

FIG. 10 illustrates example user elements 1000 that can include one or more charge pump converters in accordance with embodiments of the disclosure. The concepts described above may be implemented in various types of user elements, such as mobile terminals, smart watches, tablets, computers, navigation devices, access points, and like wireless communication devices that support wireless communications, such as cellular, wireless local area network (WLAN), Bluetooth, and near field communications. The illustrated user elements 1000 will generally include a control system 1002, a baseband processor 1004, transmit circuitry 1006, receive circuitry 1008, antenna switching circuitry 1010, multiple antennas 1012, and user interface circuitry 1014. In a non-limiting example, the control system 1002 can be a field-programmable gate array (FPGA) or an application-specific integrated circuit (ASIC), as an example. In this regard, the control system 1002 can include at least a microprocessor(s), an embedded memory circuit (s), and a communication bus interface(s). The receive circuitry 1008 receives radio frequency signals via the antennas 1012 and through the antenna switching circuitry 1010 from one or more base stations. A low noise amplifier and a filter of the receive circuitry 1008 cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 1004 processes the digitized received signal to extract the information or data bits conveyed in the received signal. This processing typically comprises demodulation, decoding, and error correction operations, as will be discussed on greater detail below. The baseband processor 1004 is generally implemented in one or more digital signal processors (DSPs) and application specific integrated circuits (ASICs).

For transmission, the baseband processor 1004 receives digitized data, which may represent voice, data, or control information, from the control system 1002, which it encodes for transmission. The encoded data is output to the transmit circuitry 1006, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission and deliver the modulated carrier signal to the multiple antennas 1012 through the antenna switching circuitry 1010. The multiple antennas 1012 and the replicated transmit and receive circuitries 1006, 1008 may provide spatial diversity. Modulation and processing details will be understood by those skilled in the art.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A charge pump converter, comprising:
- an input signal line;
- an output signal line;
- a first switch;
- a second switch;
- a first charge storage device connected between the first switch and the second switch;
- a third switch; and
- a second charge storage device connected between the second switch and the third switch, wherein the charge pump converter is operable to operate:
  - the first switch, the second switch, and the third switch such that the charge pump converter is in a charging state that charges the first charge storage device and the second charge storage device; and
  - the first switch, the second switch, and the third switch such that the first charge storage device and the second charge storage device are in parallel with each other and the first charge storage device and the second charge storage device are in series with the input signal line and the output signal line so that the charge pump converter is in a multiplying state that discharges the first charge storage device and the second charge storage device;

wherein:
  - the first switch has a first terminal, a second terminal, and a third terminal, wherein the first terminal is connected to the input signal line, the second terminal is connected to the first charge storage device, and the third terminal is connected to the output signal line;
  - the second switch has a fourth terminal, a fifth terminal, a sixth terminal, a seventh terminal, and an eighth terminal, wherein the fourth terminal is connected to the first charge storage device, the fifth terminal is connected to the input signal line, the seventh terminal is connected to the output signal line, and the eighth terminal is connected to the second charge storage device, and wherein the sixth terminal is electrically between the fourth terminal and the eighth terminal so that the first one and the second one of the charge storage devices are connected in series with each other in the charging state; and
  - the third switch has a ninth terminal connected to the second charge storage device.

2. The charge pump converter of claim 1, wherein the first charge storage device and the second charge storage device are capacitors.

3. The charge pump converter of claim 1, wherein:
- the first switch is a first single pole double throw switch;
- the second switch is a double pole double throw switch; and
- the third switch is a second single pole double throw switch.

4. The charge pump converter of claim 1, wherein the first switch, the second switch, and the third switch are each one or more transistors.

5. The charge pump converter of claim 4, wherein the one or more transistors are metal-oxide-semiconductor field effect transistors.

6. A method of operating a fractional charge pump converter comprising:
- controlling or setting switches into a state that configures a fractional charge pump converter to a charging state, wherein, in the charging state, a first one and a second one of charge storage devices are charged, wherein:
  - the switches comprise a first switch, a second switch, and a third switch, wherein:
  - the first switch has a first terminal, a second terminal, and a third terminal, wherein the first terminal connected to an input signal line, the second terminal is connected to the first one of the charge storage devices, and the third terminal is connected to an output signal line;
  - the second switch has a fourth terminal, a fifth terminal, a sixth terminal, a seventh terminal, and an eighth terminal, wherein the fourth terminal is connected to the first one of the charge storage devices, the fifth terminal is connected to the input signal line, the seventh terminal is connected to the output signal line, and the eighth terminal is connected to the second one of the charge storage devices, and wherein the sixth terminal is electrically between the fourth terminal and the eighth terminal so that the first one and the second one of the charge storage devices are connected in series with each other in the charging state; and the third switch has a ninth terminal connected to the second one of the charge storage devices; and controlling or setting the switches to a different state that configures the first one of the charge storage devices and the second one of the charge storage devices in parallel with each other and the first one of the charge storage devices and the second one of the charge storage devices are in series with the input signal line and the output signal line so that the charge pump converter is the fractional charge pump converter from the charging state to a multiplying state, wherein, in the multiplying state, the charge storage devices are discharged.

7. The method of claim 6, wherein, in the multiplying state, a voltage level stored in the charge storage devices is discharged to add to an input voltage to generate an output voltage.

8. The method of claim 7, wherein the output voltage is equal to the voltage level stored in the charge storage devices plus the input voltage.

9. The method of claim 6, wherein for at least the first one of the storage devices, the multiplying state enables a voltage level stored on the first one of the storage devices to discharge and add to an input voltage to generate an output voltage.

10. The method of claim 6, wherein for at least the first one of the storage devices, the multiplying state enables six (6) V stored on the first one of the storage devices to discharge and add to a twelve (12) V input voltage to generate an eighteen (18) V output voltage.

11. A user element including a charge pump converter, the charge pump converter comprising:

a first switch;

a second switch;

a first charge storage device connected between the first switch and the second switch;

a third switch; and a second charge storage device connected between the second switch and the third switch, wherein the charge pump converter is operable to operate:

the first switch, the second switch, and the third switch such that the charge pump converter is in a charging state that charges the first charge storage device and the second charge storage device; and the first switch, the second switch, and the third switch such that the first charge storage device and the second charge storage device are in parallel with each other and the first charge storage device and the second charge storage device are in series with an input signal line and an output signal line so that the charge pump converter is in a multiplying state that discharges the first charge storage device and the second charge storage device;

wherein:

the first switch has a first terminal, a second terminal, and a third terminal, wherein the first terminal is connected to the input signal line, the second terminal is connected to the first charge storage device, and the third terminal is connected to the output signal line;

the second switch has a fourth terminal, a fifth terminal, a sixth terminal, a seventh terminal, and an eighth terminal, wherein the fourth terminal is connected to the first charge storage device, the fifth terminal is connected to the input signal line, the seventh terminal is connected to the output signal line, and the eighth terminal is connected to the second charge storage device, and wherein the sixth terminal is electrically between the fourth terminal and the eighth terminal so that the first one and the second one of the charge storage devices are connected in series with each other in the charging state; and the third switch has a ninth terminal connected to the second charge storage device.

12. The user element of claim 11, wherein the first charge storage device and the second charge storage device are capacitors.

13. The user element of claim 11, wherein:

the first switch is a first single pole double throw switch;

the second switch is a double pole double throw switch; and the third switch is a second single pole double throw switch.

14. The user element of claim 11, wherein the first switch, the second switch, and the third switch are each one or more transistors.

15. The user element of claim 14, wherein the one or more transistors are metal-oxide-semiconductor field effect transistors.

* * * * *